United States Patent
Hatanaka et al.

(10) Patent No.: US 6,299,727 B1
(45) Date of Patent: Oct. 9, 2001

(54) INCOMBUSTIBLE SOUND-ABSORBING ELECTRIC RADIATION-ABSORBING CEILING PANEL

(75) Inventors: Hideyuki Hatanaka; Masato Ohtsubo, both of Chiba (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 09/592,647

(22) Filed: Jun. 13, 2000

(30) Foreign Application Priority Data

| Jun. 15, 1999 | (JP) | 11-168356 |
| Sep. 28, 1999 | (JP) | 11-274127 |
| Dec. 28, 1999 | (JP) | 11-374349 |
| May 29, 2000 | (JP) | 12-158578 |

(51) Int. Cl.$^7$ .................................................. D21H 17/00
(52) U.S. Cl. ................ 162/125; 162/125; 162/129; 162/130; 162/135; 162/145; 162/152; 428/300.4
(58) Field of Search ............... 52/144, 145; 162/125, 162/129, 130, 135, 145, 152; 428/300.4; 442/411, 415

(56) References Cited

U.S. PATENT DOCUMENTS

| 3,771,213 | * | 11/1973 | Peraro | 29/480 |
| 4,228,194 | * | 10/1980 | Meeder | 428/288 |
| 5,800,676 | * | 9/1998 | Koike et al. | 162/145 |
| 5,972,253 | * | 10/1999 | Kimber | 264/29.7 |
| 6,037,400 | * | 3/2000 | Kitahata et al. | 524/495 |
| 6,111,755 | * | 9/2000 | Nagata et al. | 428/408 |

\* cited by examiner

*Primary Examiner*—Carl D. Friedman
*Assistant Examiner*—Naoko Slack
(74) *Attorney, Agent, or Firm*—Nixon Peabody LLP; David S. Safran

(57) ABSTRACT

The present invention provides a ceiling panel intended for good design which exhibits a light weight, sufficient flexural strength, incombustibility, sound-absorbing properties and heat insulation properties and desirable electric radiation-absorbing properties as an interior ceiling panel that acts as a best member for solving problems with communications by wireless LAN. The present invention also provides an interior ceiling panel having enhanced electric radiation barrier properties attained by applying a metal foil to the foregoing ceiling panel. A novel incombustible sound-absorbing electric radiation-absorbing ceiling panel having a thickness of from 1 mm to 30 mm is obtained by subjecting a water-dispersed slurry of a mixture of from 67 to 92 wt-% of a rock wool, from 0.5 to 8 wt-% of a beaten pulp, from 2 to 13 wt-% of a binder made of an organic resin, from 0.15 to 1 wt-% of a flocculating agent, from 0.5 to 10 wt-% of a natural mineral fiber and from 0.02 to 1 wt-% of a carbon fiber having a fiber length of from 1 mm to 30 mm to wet paper making.

8 Claims, No Drawings

INCOMBUSTIBLE SOUND-ABSORBING ELECTRIC RADIATION-ABSORBING CEILING PANEL

FIELD OF THE INVENTION

The present invention relates to a metal foil-laminated incombustible sound-absorbing electric radiation-absorbing ceiling panel intended for good design having a light weight and sufficient flexural strength, incombustibility, sound-absorbing properties, heat insulation properties and electric radiation-absorbing properties (sometimes, called radiowave absorbing properties); a metal foil-laminated incombustible electric radiation-absorbing ceiling panel having enhanced electric radiation barrier properties attained by applying a metal foil to the foregoing ceiling panel; and an incombustible-sound-adsorbing ceiling panel in which an organic paint comprising a carbon fiber is applied on the back surface of the ceiling panel.

BACKGROUND OF THE INVENTION

The spread of wireless communications apparatus such as portable telephone and PHS is remarkable. Wireless communications apparatus for use in wireless data communications network called wireless LAN have rapidly spread in offices, stores, factories, warehouses, etc. A technique is known for executing an electric radiation barrier material made of metal foil or mesh or electrically-conductive fiber for the purpose of preventing the entrance of noise electric radiation from the exterior of a specific room such as office or the leakage of data to the exterior of the room in the case where these wireless communications apparatus are used in the specific room.

However, when such an electric radiation barrier material is applied, the interior of the room exhibits a high reflectivity of electric radiation, causing electric radiation transmitted from wireless communications apparatus to be reflected by the inner wall, ceiling, floor, steel furniture and building material, etc. Thus, reflected electric radiations having different phases reach the receiving terminal. Further, multiple reflected electric radiations from the ceiling, wall and floor reach the receiving terminal, making it impossible for received electric radiation to be recognized as a normal signal. Accordingly, the wireless communications require an abnormally prolonged time or are disabled. Even when the foregoing electric radiation material is not intentionally applied, the modern offices often comprise a metallic deck plate provided on the ceiling and floor or a metallic double-floor panel provided on the floor, giving an atmosphere causing vertical reflection of electric radiation. These offices often comprise a steel partition wall as a wall, giving an atmosphere causing horizontal reflection of electric radiation.

When wireless communications apparatus are used in these interior atmospheres, maltransmission due to reflected electric radiations having difference phases or obstruction in communications due to the effect of reflected electric radiations which have arrived with a time lag can occur as in the case where the foregoing electric radiation barrier material is intentionally applied. In order to countermeasure against these phenomena, it is useful to apply a member for inhibiting the reflection of electric radiation to the interior material of the room. A ferrite tile or a cement material or plasterboard having ferrite or an electrically-conductive material incorporated therein has heretofore been used. Further, an execution method has been proposed involving the integration of a felt-like electric radiation-absorbing material with the back surface or the base board of the ceiling or floor.

However, the foregoing conventional execution method is troublesome. In addition, the foregoing execution method is disadvantageous in that the ferrite tile or a cement material or plasterboard having ferrite or an electrically-conductive material incorporated therein has a high specific gravity and thus takes much time to apply. These materials are also expensive. Supposing that the prevention of reflection of electric radiation is carried out by applying an electric radiation-absorbing material to the floor or wall among various positions in the interior materials, it is usual that steel desks are installed on the floor, eventually causing the floor to act as an electric radiation reflecting material that can impair the electric radiation-absorbing effect of the electric radiation-absorbing material applied to the floor. Even when an electric radiation-absorbing material is applied to the wall of the room, steel bookshelves or rockers are often installed in front of the wall, eventually causing the most part of the wall to act as an electric radiation reflecting material that can impair the effect of the electric radiation-absorbing material thus applied.

On the contrary, when an electric radiation-absorbing material is applied to the ceiling, there is no case where some electric radiation reflecting materials are applied to the interior side of the ceiling. Thus, even when steel desks or bookshelves are installed in the room to change the conditions of the interior of the room, the electric radiation-absorbing properties of the ceiling can be rarely impaired. Further, since the transmission-reception apparatus of wireless LAN are often installed on desks or personal computers on the desks during use, electric radiations thus transmitted are often reflected by the ceiling. Thus, in order to lessen reflected electric radiations, it is preferred that an electric radiation-absorbing material be installed on the ceiling.

However, the foregoing conventional execution method is disadvantageous in that the ferrite tile or ferrite-containing plasterboard used not only can be hardly applied due to its high specific gravity but also is expensive. This method is further disadvantageous in that the plasterboard becomes black. These materials are also disadvantageous in earthquake resistance.

SUMMARY OF THE INVENTION

It is therefore an object of the invention to provide a ceiling panel intended for good design which exhibits a light weight, sufficient flexural strength, incombustibility, sound-absorbing properties and heat insulation properties and desirable electric radiation-absorbing properties as an interior ceiling panel that acts as a best member for solving problems with communications by wireless LAN.

It is another object of the invention to provide an interior ceiling panel having enhanced electric radiation barrier properties attained by applying a metal foil to the foregoing ceiling panel.

These and other objects of the present invention will become apparent from the following detailed description and examples.

It was found that the foregoing objects of the invention are accomplished by a process which comprises subjecting a mixture of a rock wool for providing incombustibility, sound-absorbing properties and heat insulation properties, a beaten pulp generally called gel for providing strength and water resistance, an organic binder, a flocculating agent for providing the binder with collecting power and enhanced strength during paper making, a natural mineral fiber for improving the dimensional stability, external appearance, surface smoothness and strength of the resulting panel, an organic water repellent for providing water repellency and a carbon fiber for providing electric radiation-absorbing properties to dispersion in water to form a slurry, and then subjecting the slurry to wet paper making.

The foregoing objects of the present invention are accomplished with an incombustible sound-absorbing electric radiation-absorbing ceiling panel having a thickness of from 1 mm to 30 mm obtained by subjecting a water-dispersed slurry of a mixture of from 67 to 92 wt-% of a rock wool, from 0.5 to 8 wt-% of a beaten pulp, from 2 to 13 wt-% of a binder made of an organic resin, from 0.15 to 1 wt-% of a flocculating agent comprising an organic high molecular resin and an inorganic salt, from 0.5 to 10 wt-% of a natural mineral fiber and from 0.02 to 1 wt-% of a carbon fiber having a fiber length of from 1 mm to 30 mm to wet paper making.

The foregoing objects of the present invention are accomplished with an incombustible sound-absorbing electric radiation-absorbing ceiling panel with a thickness of from 1 mm to 30 mm having a laminated structure comprising a layer obtained by subjecting a water-dispersed slurry of a primary mixture of from 67 to 92 wt-% of a rock wool, from 0.5 to 8 wt-% of a beaten pulp, from 2 to 13 wt-% of a binder made of an organic resin, from 0.15 to 1 wt-% of a flocculating agent comprising an organic high molecular resin and an inorganic salt and from 0.5 to 10 wt-% of a natural mineral fiber to wet paper making and a layer obtained by subjecting a water-dispersed slurry of a secondary mixture having the same composition as the primary mixture except for containing from 0.02 to 1 wt-% of a carbon fiber having a fiber length of from 1 mm to 30 mm to wet paper making, in which the invention is intended for design registration.

The carbon fiber to be incorporated in the foregoing incombustible sound-absorbing electric radiation-absorbing ceiling panel preferably has been subjected to a preliminary treatment which comprises introducing a carbon fiber into water in a proportion of from 0.5 to 2 wt-% based on the weight of water, and then stirring the mixture by a mixer at a rotary speed of from 100 to 400 r.p.m.

The foregoing incombustible sound-absorbing electric radiation-absorbing ceiling panel preferably comprises an additive such as inorganic filler incorporated therein in an amount of 50 wt-% or less to substitute for the rock wool, which is incorporated therein as a main component.

In order to improve the barrier properties of the foregoing incombustible sound-absorbing electric radiation-absorbing ceiling panel with respect to electric radiation and the absorption of electric radiation by the incombustible sound-absorbing electric radiation-absorbing ceiling panel due to resonance phenomenon with reflected electric radiation, the incombustible sound-absorbing electric radiation-absorbing ceiling panel is preferably a metal foil-laminated ceiling panel comprising a metal foil applied to the back surface thereof.

On the other hand, in the case where the foregoing incombustible sound-absorbing electric radiation-absorbing ceiling panel is allowed to exert an effect of absorbing electric radiation with no metal foil or plate disposed on the back surface thereof, that is, the absorption of electric radiation due to resonance phenomenon of electric radiation reflected by a metal foil or plate is not added, the content of the carbon fiber having a fiber length of from 1 mm to 30 mm can be from 0.08 to 0.4 wt-% to provide preferred electric radiation-absorbing properties.

Even when the content of the carbon fiber is as even smaller as 0.04 to 0.08 wt-%, the foregoing incombustible sound-absorbing electric radiation-absorbing ceiling panel can exhibit preferred electric radiation-absorbing properties even free of metal foil or plate provided on the back surface thereof by applying an organic paint having a greater carbon fiber content than above, preferably from 1.0 to 15.0 wt-%, to the back surface thereof in an amount of from 100 g to 3,000 $g/m^2$.

DETAILED DESCRIPTION OF THE INVENTION

The incombustible sound-absorbing electric radiation-absorbing ceiling panel according to the invention will be further described hereinafter.

The rock wool constituting the invention can be obtained by melting a mineral mixture containing from 35 to 55 wt-% of $SiO_2$, from 10 to 20 wt-% of $Al_2O_3$, from 5 to 40 wt-% of MgO, from 5 to 40 wt-% of CaO, from 0 to 10 wt-% of FeO and from 0 to 10 wt-% of a minor component such as $Na_2O$, $K_2O$, $TiO_2$ and MnO as a starting material in a cupola or electric furnace, and then subjecting the molten material to blowing process or spinning process using a high speed rotary material so that it is made fibrous. The resulting fiber is in the form of wool and has a length of from several millimeters to scores of millimeters.

The content of rock wool is preferably from 67 to 92 wt-% from the standpoint of incombustibility and sound absorbing qualities or strength. When the content of rock wool falls be less than 67 wt-%, the proportion of the organic binder is relatively great, impairing the incombustibility and sound absorbing qualities of the ceiling panel. On the contrary, when the content of rock wool exceeds 92 wt-%, the proportion of the organic binder is relatively low, making the flexural strength of the ceiling panel insufficient for interior.

The content of beaten pulp is preferably from 0.5 to 8 wt-% from the standpoint of incombustibility and water filtering characteristics during paper making or strength as interior ceiling panel. When the content of beaten pulp falls below 0.5 wt-%, the resulting ceiling panel exhibits an insufficient strength. On the contrary, when the content of beaten pulp exceeds 8 wt-%, the resulting ceiling panel exhibits deteriorated incombustibility and water filtering characteristics during production and hence impaired fire resistance and productivity.

Examples of the material to be used in the foregoing organic binder include power of starch, polyvinyl alcohol, polyethylene and paraffin, powder of thermosetting resin such as phenolic resin, melamine resin and epoxy resin, and emulsion of acrylic resin, modified acrylic resin, polyvinyl acetate, ethylene-acetic acid copolymer resin, polyvinylidene chloride resin, modified polyvinylidene chloride resin, epoxy resin and urethane resin. The content of the organic binder is preferably from 2 to 13 wt-% from the standpoint of incombustibility and strength. When the content of the organic binder exceeds 13 wt-%, the resulting ceiling panel exhibits impaired incombustibility. On the contrary, when the content of the organic paint falls below 2 wt-%, the resulting ceiling panel exhibits an insufficient flexural strength. By adding aluminum hydroxide to substitute for the rock wool, the organic binder can be added in an amount of from 13 to 20 wt-%.

Since the ceiling panel according to the invention is prepared according to wet paper-making process, it is preferable that a flocculating agent such as polyacrylamide and sulfuric acid band for effectively retaining an organic binder be added in a small amount. The content of the high molecular flocculating agent is preferably from 0.15 to 1 wt-% from the standpoint of effect on strength and incombustibility.

The ceiling panel according to the invention preferably comprises a fiber of natural mineral such as attapulgite and sepiolite incorporated therein for the purpose of enhancing the strength, dimensional stability and moisture-flexing resistance. The content of the natural mineral fiber is preferably from 0.5 to 10 wt-% from the standpoint of water filtering characteristics taking part in the productivity during wet paper-making and strength When the content of the natural mineral fiber exceeds 10 wt-%, the time required for filtering water is prolonged, impairing the productivity. When the content of the natural mineral fiber falls below 0.5 wt-%, the resulting ceiling panel exhibits insufficient dimensional stability and moisture-flexing resistance.

The ceiling panel according to the invention preferably comprises a water repellent such as wax emulsion and silicon resin emulsion incorporated therein in a small amount to render itself water-repellent. The content of the water repellent is preferably from 0.1 to 0.5 wt-% from the standpoint of water repellency, strength and incombustibility.

Referring to the constituents of the ceiling panel of the invention, as a component for providing electric radiation-absorbing properties there is used a fibrous electrically-conductive material. As such a fibrous electrically-conductive material there is preferably used a PAN-based or pitch-based carbon fiber having a fiber length of from 1 to 30 mm. Representative examples of such a carbon fiber include Xylus (produced by OSAKA GAS CO., LTD.), Toreca (produced by TORAY INDUSTRIES, INC.), and Besfite (produced by TOHO RAYON CO., LTD.). The more the fiber length of carbon fiber is, the less is the minimum amount of the carbon fiber required to exhibit good electric radiation-absorbing properties but the more easily can be entangled carbon fibers and the worse is dispersibility. Thus, when the fiber length of carbon fiber is increased, the resulting ceiling panel exhibits deteriorated electric radiation-absorbing properties. Accordingly, the fiber length of carbon fiber is preferably 30 mm or less. On the contrary, carbon fiber having a fiber length of less than 1 mm can be fairly dispersed but can hardly exert an effect of providing dielectric loss, which is the principle of absorption of electric radiation. The resulting ceiling panel exhibits deteriorated electric radiation-absorbing properties.

It was found that when the content of the foregoing carbon fiber is 0.02 wt-% or more, good electric radiation-absorbing properties can be attained. When the content of the carbon fiber exceeds 1 wt-%, the resulting ceiling panel exhibits too high electric radiation reflecting properties possibly causing the deterioration of electric radiation-absorbing properties thereof. Thus, the content of the carbon fiber is preferably from 0.02 to 1 wt-%. It is presumed that the carbon fiber thus incorporated acts as a dielectric material to cause the loss of electric radiation energy due to dielectric loss in a frequency band of gigahertz or more, attaining desired electric radiation-absorbing properties.

The incombustible sound-absorbing electric radiation-absorbing ceiling panel according to the invention can be obtained by a process which comprises dispersing a mixture of a rock wool, an organic binder, a binding aid and a carbon fiber in water, subjecting the dispersion to paper making by a paper making machine such as cylindrical paper making machine, longitudinal paper making machine and roto former to form a wet mat, drying and curing the mat, and then cutting the mat into arbitrary shape. Although the main constituents and preparation process of the ceiling panel of the invention have been described above, the organic binder may comprise a fire retardant or inorganic material incorporated therein in a small amount for the purpose of improving the fire resistance thereof and reducing the cost.

The ceiling panel of the invention has a thickness of from 1 to 30 mm, preferably from 9 to 19 mm. The ceiling panel of the invention preferably exhibits a bulk density of from 0.3 to 0.5 $g/cm^3$.

Another embodiment of the incombustible sound-absorbing electric radiation-absorbing ceiling panel according to the invention is a ceiling panel having a laminated structure comprising at least two layers, i.e., layer free of carbon fiber and layer containing a carbon fiber as described in claim 2. The foregoing ceiling panel can be obtained by either of the following two wet paper making processes, i.e., process which comprises forming a primary mixture of from 67 to 92 wt-% of a rock wool, from 0.5 to 5 wt-% of a beaten pulp, from 2 to 13 wt-% of a binder comprising an organic resin, from 0.15 to 1 wt-% of a flocculating agent comprising an organic high molecular resin and an inorganic salt and from 0.5 to 10 wt-% of a natural mineral fiber into a layer, and then imposing a water-dispersed slurry of a secondary mixture having the same composition as the primary mixture except for comprising a carbon fiber having a fiber length of from 1 to 30 mm incorporated therein in an amount of from 0.02 to 1 wt-% on the primary mixture layer to form a laminate and process which comprises forming a water-dispersed slurry of the secondary mixture having a carbon fiber content of from 0.02 to 1 wt-% into a layer, and then imposing a water-dispersed slurry of the primary mixture on the secondary mixture layer to form a laminate.

In the case where the carbon fiber is incorporated in the layer of ceiling panel, some of the black fibers come to the surface in the form of linear dispersion to disadvantage, though depending on its content, giving obstruction particularly in the production of ceiling panel having a pure-white surface. It is therefore preferred that the foregoing layers be laminated in such an arrangement that the layer free of carbon fiber lies on the surface side, i.e., faces the interior of the room while the layer containing carbon fiber lies on the other side, if the product is a ceiling panel. Referring to the preparation process, it doesn't matter whichever is formed, the layer containing carbon fiber or the layer free of carbon fiber. It is preferred that the two layers be continuously formed and laminated. It is preferred that the layer containing carbon fiber be prepared as the back side layer for better design. The thickness of the various layers are not specifically limited. In practice, however, it is preferred from the standpoint of dispersibility of carbon fiber that the layer free of carbon fiber be formed slightly thin while the layer containing carbon fiber be formed thicker.

Since the foregoing carbon fibers tend to be loosened from each other, they cannot be sufficiently dispersed when merely stirred with other ingredients in water, making it impossible to provide good electric radiation-absorbing properties. The inventors made extensive studies of the foregoing problem. As a result, it was found that a good dispersion can be obtained by a process which comprises introducing a carbon fiber into water in a proportion of from 0. 5 to 2 wt-% based on the weight of water, and then stirring the mixture by a mixer at a rotary speed of from 100 to 400 r.p.m. as described in claim 3. The dispersion thus obtained can be mixed with other ingredients to obtain an incombustible sound-absorbing electric radiation-absorbing ceiling panel which exhibits desired electric radiation-absorbing properties.

As described in claim 4, an inorganic filler such as aluminum hydroxide, perlite and silasballoon may be incorporated in the ceiling panel of the invention as a constituent for the purpose of adjusting the incombustibility and density of the ceiling panel. The mixing proportion of aluminum hydroxide is preferably 50 wt-% or less to substitute for the rock wool. When the mixing proportion of aluminum hydroxide exceeds 50 wt-%, the time required for filtering water is prolonged, deteriorating the productivity during formation and lowering the strength of the product. Perlite or silasballoon, too, may be used to substitute for the rock wool. Thus, the mixing proportion of perlite or silasballoon is preferably 30 wt-% or less from the standpoint of density and strength.

As described in claim 5, the arrangement that the incombustible sound-absorbing electric radiation-absorbing ceiling panel comprises a metal foil applied to the back surface thereof makes it possible to provide a ceiling panel having incombustibility and electric radiation-absorbing properties as well as electric radiation barrier properties. Referring to electric radiation-absorbing properties, resonance phenomenon of electric radiation reflected by the metal foil further improves electric radiation-absorbing properties to exert a further effect coupled with electric radiation barrier properties. Such a ceiling panel comprising a metal foil integrally applied to the back surface thereof is advantageous also in economy and workability. The term "back surface" as used herein is meant to indicate the surface of the ceiling panel thus applied opposite the surface thereof facing the interior of the room to which it is applied. A metal foil such as aluminum foil and steel foil, if applied to the foregoing ceiling panel, may be bonded to the ceiling panel with an adhesive such as acrylic resin, vinyl acetate resin, ethylene resin, vinyl resin, urethane resin, epoxy resin and synthetic rubber. The metal foil is bonded to the back surface of the foregoing ceiling panel. The thickness of the metal foil is from 5 to 200 $\mu$m taking into account surface protection and panel workability. More preferably, a soft metal foil having a thickness of from 50 $\mu$m to 100 $\mu$m is used.

On the other hand, the results of studies of conditions under which electric radiation can be absorbed in connection with the foregoing resonance phenomenon will be described in detail.

In the arrangement that an electric radiation reflecting material such as aluminum foil is provided on the back surface of the electric radiation-absorbing material to cause the electric radiation-absorbing material to exert an dielectric and permeative effect that inverts the phase from incident electric radiation to reflected radiation to cause loss of electric radiation energy, that is, resonance effect that gives electric radiation-absorbing properties, an electric radiation-reflecting layer is an essential constituent. However, since the electric radiation-absorbing material comprising such an electric radiation reflecting material provided on the back surface thereof is obtained by sticking a metal foil such as aluminum foil to the electric radiation-absorbing material, it requires a raised cost. Since the metal such as aluminum can be corroded, the electric radiation-absorbing material is occasionally insufficiently adhered to the resin adhesive when bonded to other structures.

A first method of providing a ceiling panel having a plasterboard sacrificially applied and a rock wool plate decoratively applied thereto with electric radiation-absorbing properties is to laminate an electric radiation-absorbing plasterboard comprising ferrite or electrically conductive fiber incorporated therein and an aluminum foil laminated to the back surface thereof with an incombustible sound-absorbing ceiling panel on the lower surface thereof with a tacker and an adhesive. A second method is to laminate a plasterboard having a usual composition with an aluminum foil on the lower surface thereof and an incombustible sound-absorbing electric radiation-absorbing decorative ceiling panel comprising ferrite or electrically conductive fiber incorporated therein on the other surface thereof with a tacker and an adhesive. A third method is to laminate an incombustible sound-absorbing electric radiation-absorbing decorative ceiling panel comprising ferrite or electrically-conductive fiber incorporated thereof having a usual plasterboard having no electric radiation-absorbing properties applied thereto and a metal foil such as aluminum foil applied to the back surface thereof with a plasterboard with a tacker and an adhesive.

However, the first method is disadvantageous in that the cost of the plasterboard is raised due to the lamination with a metal foil such as aluminum foil. The second method, too, is disadvantageous in that the plasterboard costs much. In addition, since a metal foil such as aluminum foil is provided interposed between the plasterboard and the decorative ceiling panel, the adhesion to the decorative ceiling panel is deteriorated when the metal foil is corroded, causing the decorative ceiling panel to be easily peeled. In the third method, the plasterboard doesn't raise cost. However, the third method is disadvantageous in that the electric radiation-absorbing decorative ceiling panel costs much. In addition, for the same reason as in the second method, when the metal foil is corroded, the adhesion to the decorative ceiling panel is deteriorated, causing the decorative ceiling panel to be easily peeled. It goes without saying that a metal foil-laminated electric radiation-absorbing plasterboard cannot be used for a so-called system ceiling which is directly applied to the ceiling or placed on a ceiling fitting (lay-in method) or supported with fittings inserted into small holes made therein. Further, an incombustible sound-absorbing electric radiation-absorbing ceiling panel having a metal foil applied to the back surface of a decorative ceiling panel costs much and thus has never been widely used.

Extensive studies were made of the results of electric radiation-absorbing properties taking into account the foregoing circumstances. As a result, it was found that since a metal plate is installed on the back surface of the ceiling panel as a specimen for the reason of electric radiation-absorbing test, absorption characteristics developed by so-called resonance with reflected electric radiation are added to provide good absorption characteristics. Accordingly, it was found that the carbon fiber exhibits good electric radiation-absorbing properties when incorporated in an amount of 0.02 wt-% or more in the conventional electric radiation-absorbing test but exhibits deteriorated electric radiation-absorbing properties and thus doesn't exhibit better absorbing properties when incorporated in an amount of from 0.02 wt-% to less than 0.08 wt-% in the absence of electric radiation reflecting material such as metal foil on the back surface of the ceiling panel.

On the other hand, when the carbon fiber is incorporated in an amount of from 0.4 to 1.5 wt-%, some electric radiation-absorbing properties are exhibited. However, as the content of the carbon fiber increases, the electric radiation reflecting properties become strong, resulting in the deterioration of absorption characteristics. Further, when the content of the carbon fiber exceeds 1.5 wt-%, the electric radiation reflectance of the panel becomes too high, causing remarkable deterioration of electric radiation-absorbing properties. It was thus found that when a carbon fiber having a fiber length of from 1 to 30 mm is incorporated in an amount of from 0.08 to 0.4 wt-%, desirable absorption of electric radiation can be effected to advantage even if a metal foil is not applied to the back surface of the incombustible sound-absorbing electric radiation-absorbing ceiling panel as described in claim 6.

Moreover, it was found that although desired absorption characteristics can hardly be obtained in the absence of electric radiation reflecting material such as metal foil on the back surface of the ceiling panel when the content of the carbon fiber is low as mentioned above, desired electric radiation-absorbing properties can be obtained by applying an organic paint having a greater content of carbon fiber to the back surface of the ceiling panel in an amount of from 100 to 3,000 g/m$^2$ even when the content of the carbon fiber in the layer is so low. It is presumed that the arrangement of carbon fiber layers having different carbon fiber contents adjacent to each other makes it possible to enhance the resonance effect of the two layers, improving the absorption characteristics. Further, this arrangement makes it possible to reduce the content of carbon fiber in the surface layer, giving a good external appearance.

The content of the carbon fiber in the surface side is preferably 0.08 wt-% or less, more preferably from 0.04 to 0.08 wt-%. The content of the carbon fiber in the organic paint for the back surface is preferably 1.0 wt-% or more, more preferably from 1.0 to 15.0 wt-%.

As the organic paint of the invention there is preferably used a vinyl acetate-based emulsion paint. Examples of such a vinyl acetate-based emulsion paint include polyvinyl acetate-based emulsion paint (PC coat), polyvinyl alcohol-based emulsion paint, and polyvinyl acetal-based emulsion paint.

As the carbon fiber to be incorporated in the foregoing organic paint there may be used the same carbon fiber as mentioned above. The fiber length of the carbon fiber is not specifically limited. In practice, however, it is preferably from 0.1 to 30 mm, particularly from 0.5 to 2 mm from the standpoint of ease of uniform dispersion or mixing.

EXAMPLE

The incombustible sound-absorbing electric radiation-absorbing ceiling panel and metal foil-laminated ceiling panel of the invention will be further described in Examples 1 to 11 and Comparative Examples 1 and 2 in connection with Tables 1 and 2, Examples 12 to 19, Comparative Example 3 and Reference Examples 1 and 2 in connection with Tables 3 and 4 and Example 20 in connection with Table 5.

Example 1

89.6 wt-% of a steel slag-based rock wool having a fiber length of from 100 to 500 μm comprising 41 wt-% of SiO$_2$, 36 wt-% of CaO, 6 wt-% of MgO, 12 wt-% of Al$_2$O$_3$ and 5 wt-% of a component such as Na$_2$O and K$_2$O, 1 wt-% of a beaten pulp obtained by beating a water dispersion of pulp by a refiner, 5.5 wt-% of a starch, 2.85 wt-% (as calculated in terms of solid content) of attapulgite which had been dispersed in water and opened, 0.2 wt-% (as calculated in terms of solid content) of a 15% aqueous solution of polyacrylamide, 0.6 wt-% of aluminum sulfate, and 0.25 wt-% (as calculated in terms of solid content) of a carbon fiber having a fiber length of 4 mm (Xylus, produced by OSAKA GAS CO., LTD.) obtained by previously introducing a carbon fiber in water in an amount of 1 wt-%, and then stirring the mixture by a mixer at a rotary speed of 200 r.p.m. for 2 minutes were mixed. The mixture was then subjected to dispersion by a mixer to prepare an aqueous slurry having a concentration of about 5 wt-%. The slurry thus prepared was subjected to paper making by means of a longitudinal paper making machine, and then dehydrated and dried to prepare an original sheet. The original sheet thus prepared was then cutting-processed on the surface thereof to obtain a panel A having a thickness of 12 mm and a bulk density of 0.4 g/cm$^3$ as an interior ceiling panel. The strength, fire resistance, heat resistance, sound absorbing coefficient, electric radiation barrier properties and electric radiation-absorbing properties of the panel A are set forth in Table 1.

Example 2

A panel B as an interior ceiling panel was obtained in the same manner as in Example 1 except that the content of carbon fiber and rock wool were 0.025 wt-% and 89.825 wt-%, respectively. The properties of the panel B are set forth in Table 1.

Example 3

A panel C having a bulk density of 0.3 g/cm$^3$ as an interior ceiling panel was obtained in the same manner as in Example 1 except that the content of carbon fiber and rock wool were 0.33 wt-% and 89.52 wt-%, respectively. The properties of the panel C are set forth in Table 1.

Example 4

A panel D as an interior ceiling panel was obtained in the same manner as in Example 1 except that the content of carbon fiber and rock wool were 0.3 wt-% and 89.55 wt-%, respectively. The properties of the panel D having a thickness of 9 mm which had been cutting-processed on the surface thereof are set forth in Table 1.

Example 5

A panel E as an interior ceiling panel was obtained in the same manner as in Example 1 except that the content of carbon fiber and rock wool were 0.15 wt-% and 89.7 wt-%, respectively. The properties of the panel E having a thickness of 15 mm which had been cutting-processed on the surface thereof are set forth in Table 1.

Example 6

A panel F having a bulk density of 0.5 g/cm$^3$ as an interior ceiling panel was obtained in the same manner as in Example 1 except that the content of carbon fiber and rock wool were 0.22 wt-% and 89.63 wt-%, respectively. The properties of the panel F are set forth in Table 1.

Example 7

A panel G as an interior ceiling panel was obtained in the same manner as in Example 1 except that the fiber length and content of carbon fiber were 1 mm and 0.4 wt-% respectively, and the content of rock wool was 89.45 wt-%. The properties of the panel G are set forth in Table 1.

Example 8

A panel H as an interior ceiling panel was obtained in the same manner as in Example 1 except that the fiber length and content of carbon fiber were 12 mm and 0.18 wt-%, respectively, and the content of rock wool was 89.67 wt-%. The properties of the panel H are set forth in Table 1.

Example 9

A panel I as an aluminum foil-laminated interior ceiling panel was prepared by applying a soft aluminum foil having a thickness of 50 µm to the back surface of the panel obtained in Example 1 with an ethylene-vinyl acetate adhesive. The properties of the aluminum foil-laminated panel I are set forth in Table 2.

Example 10

To a mixture of 85.95 wt-% of a rock wool, 3 wt-% of a beaten pulp, 7 wt-% of a polyvinyl alcohol, 3 wt-% of attalpulgite, 0.2 wt-% (as calculated in terms of solid content) of a 15% aqueous solution of polyacrylamide and 0.6 wt-% of aluminum sulfate was added 0.25 wt-% (as calculated in terms of solid content) of a carbon fiber having a fiber length of 4 mm (Xylus, produced by OSAKA GAS CO., LTD.) obtained by previously introducing a carbon fiber in water in an amount of 1 wt-%, and then stirring the mixture by a mixer at a rotary speed of 200 r.p.m. for 2 minutes. The mixture was then subjected to dispersion by a mixer to prepare an aqueous slurry having a concentration of about 5 wt-%. The slurry thus prepared was subjected to paper making by a longitudinal paper making machine, and then dehydrated and dried to prepare an original sheet. The original sheet thus prepared was then cutting-processed on the surface thereof to obtain a panel J having a thickness of 12 mm and a strength high enough for interior ceiling panel. The strength, fire resistance, heat resistance, sound absorbing coefficient, electric radiation barrier properties and electric radiation-absorbing properties of the panel J are set forth in Table 1.

Example 11

To a mixture of 60.95 wt-% of a rock wool, 3 wt-% of a beaten pulp, 7 wt-% of a polyvinyl alcohol, 3 wt-% of attalpulgite, 0. 2 wt-% (as calculated in terms of solid content) of a 15% aqueous solution of polyacrylamide, 0.6 wt-% of aluminum sulfate and 25 wt-% of aluminum hydroxide was added 0.25 wt-% (as calculated in terms of solid content) of a carbon fiber having a fiber length of 4 mm (Xylus, produced by OSAKA GAS CO., LTD.) obtained by previously introducing a carbon fiber in water in an amount of 1 wt-%, and then stirring the mixture by a mixer at a rotary speed of 200 r.p.m. for 2 minutes. The mixture was then subjected to dispersion by a mixer to prepare an aqueous slurry having a concentration of about 5 wt-%. The slurry thus prepared was subjected to paper making by a longitudinal paper making machine, and then dehydrated and dried to prepare an original sheet. The original sheet thus prepared was then cutting-processed on the surface thereof to obtain a panel K having a thickness of 12 mm, a bulk density of 0.45 g/cm$^3$ and a strength high enough for interior ceiling panel. The strength, fire resistance, heat resistance, sound absorbing coefficient, electric radiation barrier properties and electric radiation-absorbing properties of the panel K are set forth in Table 2.

Comparative Example 1

A mixture of 90.95 wt-% of a rock wool, 1 wt-% of a beaten pulp, 5.5 wt-% of a starch, 2.85 wt-% of attalpulgite, 0.2 wt-% (as calculated in terms of solid content) of a 15% aqueous solution of polyacrylamide and 0.6 wt-% of aluminum sulfate was subjected to dispersion by a mixer to prepare an aqueous slurry having a concentration of about 5 wt-%. The slurry thus prepared was subjected to paper making by a longitudinal paper making machine, and then dehydrated and dried to obtain a panel L having a thickness of 12 mm as an interior ceiling panel. The strength, fire resistance, heat resistance, sound absorbing coefficient, electric radiation barrier properties and electric radiation-absorbing properties of the panel L are set forth in Table 2.

Comparative Example 2

A mixture of 88.35 wt-% of a rock wool, 1 wt-% of a beaten pulp, 5.5 wt-% of a starch, 2.85 wt-% of attalpulgite, 0.2 wt-% (as calculated in terms of solid content) of a 15% aqueous solution of polyacrylamide, 0.6 wt-% of aluminum sulfate and 1.5 wt-% of a carbon fiber having a fiber length of 4 mm (Xylus, produced by OSAKA GAS CO., LTD.) obtained by previously introducing a carbon fiber in water in an amount of 1 wt-%, and then stirring the mixture by a mixer at a rotary speed of 200 r.p.m. for 2 minutes was subjected to dispersion by a mixer to prepare an aqueous slurry having a concentration of about 5 wt-%. The slurry thus prepared was subjected to paper making by a longitudinal paper making machine, and then dehydrated and dried to prepare an original sheet. The original sheet thus prepared was then cutting-processed on the surface thereof to obtain a panel M having a thickness of 12 mm and a strength high enough for interior ceiling panel. The strength, fire resistance, heat resistance, sound absorbing coefficient, electric radiation barrier properties and electric radiation-absorbing properties of the panel M are set forth in Table 2.

TABLE 1

|  | Example 1 Panel A | Example 2 Panel B | Example 3 Panel C | Example 4 Panel D | Example 5 Panel E | Example 6 Panel F | Example 7 Panel G |
| --- | --- | --- | --- | --- | --- | --- | --- |
| Component |  |  |  |  |  |  |  |
| Rock wool [wt-%] | 89.6 | 89.825 | 89.52 | 89.55 | 89.7 | 89.63 | 89.45 |
| Beaten pulp [wt-%] | 1 | 1 | 1 | 1 | 1 | 1 | 1 |
| Starch [wt-%] | 5.5 | 5.5 | 5.5 | 5.5 | 5.5 | 5.5 | 5.5 |
| Attalpulgite [wt-%] | 2.85 | 2.85 | 2.85 | 2.85 | 2.85 | 2.85 | 2.85 |
| Polyacrylamide [wt-%] | 0.2 | 0.2 | 0.2 | 0.2 | 0.2 | 0.2 | 0.2 |
| Aluminum sulfate [wt-%] | 0.6 | 0.6 | 0.6 | 0.6 | 0.6 | 0.6 | 0.6 |
| Carbon fiber |  |  |  |  |  |  |  |
| [mm] | 4 | 4 | 4 | 4 | 4 | 4 | 1 |
| [w-%] | 0.25 | 0.025 | 0.33 | 0.3 | 0.15 | 0.22 | 0.4 |
| Aluminum foil on back surface | None | None | None | None | None | None | None |

TABLE 1-continued

|  | Example 1 Panel A | Example 2 Panel B | Example 3 Panel C | Example 4 Panel D | Example 5 Panel E | Example 6 Panel F | Example 7 Panel G |
|---|---|---|---|---|---|---|---|
| Physical properties |  |  |  |  |  |  |  |
| Thickness [mm] | 12 | 12 | 12 | 9 | 15 | 12 | 12 |
| Bulk density [g/cm$^3$] | 0.5 | 0.4 | 0.3 | 0.4 | 0.4 | 0.5 | 0.4 |
| Unit weight [kg/m$^2$] | 4.8 | 4.8 | 3.6 | 3.6 | 6.0 | 6.0 | 4.8 |
| Flexural strength [kgf/cm$^2$] | 15.2 | 15.3 | 14.5 | 15.6 | 15.0 | 17.5 | 15.5 |
| Heat resistance [m$^2$h °C./kcal] | 0.27 | 0.26 | 0.26 | 0.20 | 0.33 | 0.28 | 0.27 |
| Fire resistance | Incombustible | Incombustible | Incombustible | Incombustible | Incombustible | Incombustible | Incombustible |
| Sound absorbing coefficient | 0.49 | 0.48 | 0.50 | 0.44 | 0.52 | 0.45 | 0.48 |
| Electric radiation barrier properties [dB] |  |  |  |  |  |  |  |
| 2.45 GHz | 4.3 | 2.5 | 4.5 | 3.9 | 4.5 | 4.2 | 3.8 |
| 5.1 GHz | 5.2 | 2.0 | 5.5 | 3.6 | 5.5 | 5.1 | 4.5 |
| Electric radiation-absorbing properties [dB] |  |  |  |  |  |  |  |
| 2.45 GHz | 15 | 6 | 11 | 12 | 9 | 14 | 10 |
| 5.1 GHz | 12 | 6 | 10 | 10 | 10 | 11 | 9 |
| Cost | Very low | Very low | Very low | Very low | Very low | Very low | Very low |
| Comprehensive evaluation | Good | Good | Good | Good | Good | Good | Good |

(* Sound absorbing coefficient is represented by value averaged over measurements at 250 Hz, 500 Hz, 1,000 Hz and 2,000 Hz.)

TABLE 2

|  | Example 8 Panel H | Example 9 Panel I | Example 10 Panel J | Example 11 Panel K | Comparative Example 1 Panel L | Comparative Example 2 Panel M |
|---|---|---|---|---|---|---|
| Component |  |  |  |  |  |  |
| Rock wool [wt-%] | 89.67 | 89.6 | 89.95 | 60.95 | 90.25 | 88.35 |
| Beaten pulp [wt-%] | 1 | 1 | 3 | 3 | 1 | 1 |
| Starch [wt-%] | 5.5 | 5.5 | — | — | 5.5 | 5.5 |
| Polyvinyl alcohol | — | — | 7 | 7 | — | — |
| Attalpulgite [wt-%] | 2.85 | 2.85 | 3 | 3 | 2.85 | 2.85 |
| Polyacrylamide [wt-%] | 0.2 | 0.2 | 0.2 | 0.2 | 0.2 | 0.2 |
| Aluminum sulfate [wt-%] | 0.6 | 0.6 | 0.6 | 0.6 | 0.6 | 0.6 |
| Aluminum hydroxide [wt-%] | — | — | — | 25 | — | — |
| Carbon fiber |  |  |  |  |  |  |
| [mm] | 12 | 4 | 4 | 4 | — | 4 |
| [w-%] | 0.18 | 0.25 | 0.25 | 0.25 | — | 1.5 |
| Aluminum foil on back surface | None | Present | None | None | None | None |
| Physical properties |  |  |  |  |  |  |
| Thickness [mm] | 12 | 12 | 12 | 12 | 12 | 12 |
| Bulk density [g/cm$^3$] | 0.4 | 0.4 | 0.4 | 0.45 | 0.4 | 0.4 |
| Unit weight [kg/m$^2$] | 4.8 | 4.8 | 4.8 | 5.4 | 4.8 | 4.8 |
| Flexural strength [kgf/cm$^2$] | 15.2 | 15.7 | 21 | 30 | 7.0 | 7.2 |
| Heat resistance [m$^2$h °C./kcal] | 0.27 | 0.26 | 0.29 | 0.25 | 0.27 | 0.26 |
| Fire resistance | Incombustible | Incombustible | Less incombustible | Incombustible | Incombustible | Incombustible |
| Sound absorbing coefficient | 0.49 | 0.48 | 0.48 | 0.42 | 0.49 | 0.48 |
| Electric radiation barrier properties [dB] |  |  |  |  |  |  |

TABLE 2-continued

|  | Example 8 Panel H | Example 9 Panel I | Example 10 Panel J | Example 11 Panel K | Comparative Example 1 Panel L | Comparative Example 2 Panel M |
|---|---|---|---|---|---|---|
| 2.45 GHz | 4.2 | 32 | 4.2 | 5.1 | 0.1 | 5.5 |
| 5.1 GHz | 4.6 | 35 | 5.0 | 4.9 | 0.2 | 5.2 |
| Electric radiation-absorbing properties [dB] | | | | | | |
| 2.45 GHz | 10 | 14 | 14 | 14 | 0 | 1.0 |
| 5.1 GHz | 8 | 11 | 12 | 11 | 0 | 1.5 |
| Cost | Very low | Low | Very low | Very low | Very low | Very low |
| Comprehensive evaluation | Good | Good | Good | Good | Poor | Poor |

(* Sound absorbing coefficient is represented by value averaged over measurements at 250 Hz, 500 Hz, 1,000 Hz and 2,000 Hz.)

Method for Measuring and Evaluating the Properties in Tables 1 and 2

Flexural strength: Measured according to JIS A 1408 (No. 5 specimen).

Heat resistance: Measured according to JIS A 1420.

Fire resistance: Measured according to JIS A 1321.

Sound absorbing coefficient: Measured according to JIS A 1409 (reverberation room).

Electric radiation barrier properties: A specimen having a thickness of from 9 to 15 mm, a length of 400 mm and a width of 400 mm is placed between a transmitting antenna and a receiving antenna every test. The specimen is then measured for transmission level by time domain method. The transmission coefficient is calculated from the comparison with the transmission level measured in the absence of specimen to determine electric radiation barrier properties.

Electric radiation-absorbing properties: In accordance with "Method for Measuring and Evaluating the Properties of Electric Radiation-Absorbing Material" under the study by Japan Association of Architecture, a specimen having a thickness of from 9 to 15 mm, a length of 400 mm and a width of 400 mm comprising a metal plate having a length of 400 mm and a width of 400 mm applied to the back surface thereof is measured for reflection coefficient by free space time domain method. The reflection coefficient is calculated from the comparison with the reflection level measured with the metal plate alone to determine electric radiation-absorbing properties.

Comparison of Examples with Comparative Examples in Tables 1 and 2

1. All the examples and comparative examples exhibit a proper flexural strength value required for interior ceiling panel.
2. Referring to heat resistance, all the examples and comparative examples exhibit sufficient insulating properties, showing no significant difference.
3. Referring to fire resistance, Examples 1 to 9 and 11 and Comparative Examples 1 and 2 are judged incombustible while Example 10 is judged less incombustible but acceptable.
4. Examples 1 to 11 and Comparative Examples 1 and 2 exhibit a proper sound absorbing coefficient, showing no significant difference.
5. Referring to electric radiation barrier properties, Examples 1 to 8 and 10 to 11 and Comparative Example 2 exhibit from 2 to 5.5 dB, which is not sufficient for general electric radiation barrier material. Example 9 exhibits 31 dB and thus satisfies the requirements for general electric radiation barrier material (30 dB or more). Comparative Example 1 exhibits no electric radiation barrier properties.
6. Referring to electric radiation-absorbing properties, Examples 1 to 11 exhibit from 6 to 15 dB at 2.45 GHz and from 6 to 12 dB at 5.1 GHz and hence sufficient absorption characteristics for countermeasuring against obstruction in wireless communication in an office in 2.4 GHz band and 5 GHz, which are used for wireless LAN system. On the other hand, Comparative Example 1, free of carbon fiber as an electrically-conductive material, exhibits no absorption characteristics and thus doesn't satisfy the foregoing requirements. On the contrary, Comparative Example 2, which has a high content of carbon fiber, doesn't exhibit sufficient absorption characteristics due to the effect of reflection of electric radiation.

For the measurement of electric radiation-absorbing properties of Examples 1 to 11 and Comparative Examples 1 and 2, "Method for Measuring and Evaluating the Properties of Electric Radiation-Absorbing Material" under the study by Japan Association of Architecture was effected on a specimen laminated with a metal plate. Accordingly, the electric radiation-absorbing properties thus measured are electric radiation-absorbing properties due to resonance phenomenon mixed with electric radiation-absorbing properties due to internal loss characteristic to the specimen. It was found difficult to measure the electric radiation-absorbing properties of an electric radiation-absorbing material free of electric radiation reflecting material on the back surface thereof due to internal loss characteristic to the specimen. The inventors made extensive studies of method for measuring the internal absorption characteristics of a specimen more accurately and expressing the difference from the absorption characteristics due to resonance phenomenon more definitely. As a result, it was found that the occurrence of resonance phenomenon can be prevented by providing some space between the specimen and the metal plate Thus, the specimen was placed with a 100 mm space provided in front of a metal plate having a size of 400 mm×400 mm so that the metal plate and the specimen are not integrated with each other to prevent the occurrence of resonance phenomenon. Under these conditions, reflection coefficient was measured by free space time domain method. The reflection coefficient was then calculated from the comparison with the reflection level measured with the metal plate alone to determine electric radiation-absorbing properties. Subsequently, the specimen was laminated with an aluminum foil on the back surface thereof so that resonance phenomenon can occur. This specimen, too, was measured for reflection coefficient by free space time domain method. In this manner, electric radiation-absorbing characteristics can be measured more efficiently.

The incombustible sound-absorbing electric radiation-absorbing ceiling panel according to the invention will be further described in Examples 12 to 19, Comparative Example 3 and Reference Examples 1 and 2 with reference also to the comparison of the conditions under which no resonance phenomenon occurs with the conditions under which resonance phenomenon occurs with an aluminum foil applied to the back surface of the ceiling panel.

Example 12

89.75 wt-% of a steel slag-based rock wool having a fiber length of from 100 to 500 µm comprising 41 wt-% of $SiO_2$, 36 wt-% of CaO, 6 wt-% of MgO, 12 wt-% of $Al_2O_3$ and 5 wt-% of a component such as $Na_2O$ and $K_2O$, 1 wt-% of a beaten pulp obtained by beating a water dispersion of pulp by a refiner, 5.5 wt-% of a starch, 2.85 wt-% (as calculated in terms of solid content) of attapulgite which had been dispersed in water and opened, 0.2 wt-% (as calculated in terms of solid content) of a 15% aqueous solution of polyacrylamide, 0.6 wt-% of aluminum sulfate, and 0.1 wt-% (as calculated in terms of solid content) of a carbon fiber having a fiber length of 4 mm (Xylus, produced by OSAKA GAS CO., LTD.) obtained by previously introducing a carbon fiber in water in an amount of 1 wt-%, and then stirring the mixture by means of a mixture at a rotary speed of 200 r.p.m. for 2 minutes were mixed. The mixture was then subjected to dispersion by a mixer to prepare an aqueous slurry having a concentration of about 5 wt-%. The slurry thus prepared was subjected to paper making by means of a longitudinal paper making machine, and then dehydrated and dried to prepare an original sheet. The original sheet thus prepared was then cutting-processed on the surface thereof to obtain a panel N having a thickness of 12 mm and a bulk density of 0.4 g/cm³ as an interior ceiling panel. The strength, fire resistance, heat resistance, sound absorbing coefficient, electric radiation barrier properties and electric radiation-absorbing properties of the panel N are set forth in Table 3 below. As shown in Table 3, the ceiling panel of Example 12 exhibits electric radiation-absorbing properties as good as 6 dB or more regardless of whether or not it comprises an aluminum foil provided on the back surface thereof.

Example 13

A panel O as an interior ceiling panel was prepared in the same manner as in Example 12 except that the content of carbon fiber and rock wool were 0.40 wt-% and 89.45 wt-%, respectively. The properties of the panel O are set forth in Table 3. As shown in Table 3, the ceiling panel of Example 13 exhibits electric radiation-absorbing properties as good as 6 dB or more regardless of whether or not it comprises an aluminum foil provided on the back surface thereof.

Example 14

A panel P as an interior ceiling panel was obtained in the same manner as in Example 12 except that the content of carbon fiber and rock wool were 0.3 wt-% and 89.55 wt-%, respectively. The properties of the panel P having a thickness of 9 mm which had been cutting-processed on the surface thereof are set forth in Table 3. As shown in Table 3, the ceiling panel of Example 14 exhibits electric radiation-absorbing properties as good as 6 dB or more regardless of whether or not it comprises an aluminum foil provided on the back surface thereof.

Example 15

A panel Q as an interior ceiling panel was obtained in the same manner as in Example 12 except that the content of carbon fiber and rock wool were 0.15 wt-% and 89.7 wt-%, respectively. The properties of the panel Q having a thickness of 15 mm which had been cutting-processed on the surface thereof are set forth in Table 3. As shown in Table 3, the ceiling panel of Example 15 exhibits electric radiation-absorbing properties as good as 6 dB or more regardless of whether or not it comprises an aluminum foil provided on the back surface thereof.

Example 16

A panel R as an interior ceiling panel was prepared in the same manner as in Example 12 except that the content of carbon fiber and rock wool were 0.3 wt-% and 89.55 wt-%, respectively. The properties of the panel R are set forth in Table 3. As shown in Table 3, the ceiling panel of Example 16 exhibits electric radiation-absorbing properties as good as 6 dB or more regardless of whether or not it comprises an aluminum foil provided on the back surface thereof.

Example 17

A panel S as an interior ceiling panel was prepared in the same manner as in Example 12 except that the fiber length and content of carbon fiber were 12 mm and 0.18 wt-%, respectively, the content of rock wool was 89.67 wt-%. The properties of the panel S are set forth in Table 3. As shown in Table 3, the ceiling panel of Example 17 exhibits electric radiation-absorbing properties as good as 6 dB or more regardless of whether or not it comprises an aluminum foil provided on the back surface thereof.

Example 18

A mixture of 86.1 wt-% of a rock wool, 3 wt-% of a gel, 7 wt-% of a polyvinyl alcohol, 3 wt-% of attapulgite, 0.2 wt-% (as calculated in terms of solid content) of a 15% aqueous solution of polyacrylamide, 0.6 wt-% of aluminum sulfate, and 0.1 wt-% (as calculated in terms of solid content) of a carbon fiber having a fiber length of 4 mm (Xylus, produced by OSAKA GAS CO., LTD.) was subjected to dispersion by a mixer to prepare an aqueous slurry having a concentration of about 5 wt-%. The slurry thus prepared was subjected to paper making by means of a longitudinal paper making machine, and then dehydrated and dried to prepare an original sheet. The original sheet thus prepared was then cutting-processed on the surface thereof to obtain a panel T having a strength high enough for an interior ceiling panel. The strength, fire resistance, heat resistance, sound absorbing coefficient, electric radiation barrier properties and electric radiation-absorbing properties of the panel T are set forth in Table 4 below. As shown in Table 4, the ceiling panel of Example 18 exhibits electric radiation-absorbing properties as good as 6 dB or more regardless of whether or not it comprises an aluminum foil provided on the back surface thereof.

Example 19

A mixture of 61.1 wt-% of a rock wool, 3 wt-% of a gel, 7 wt-% of a polyvinyl alcohol, 3 wt-% of attapulgite, 0.2 wt-% (as calculated in terms of solid content) of a 15% aqueous solution of polyacrylamide, 0.6 wt-% of aluminum sulfate, 25 wt-% of aluminum hydroxide, and 0.1 wt-% (as calculated in terms of solid content) of a carbon fiber having a fiber length of 4 mm (Xylus, produced by OSAKA GAS CO., LTD.) was subjected to dispersion by a mixer to prepare an aqueous slurry having a concentration of about 5 wt-%. The slurry thus prepared was subjected to paper making by means of a longitudinal paper making machine, and then dehydrated and dried to prepare an original sheet. The original sheet thus prepared was then cutting-processed on the surface thereof to obtain a panel U having a strength high enough for an interior ceiling panel. The strength, fire resistance, heat resistance, sound absorbing coefficient, electric radiation barrier properties and electric radiation-absorbing properties of the panel U are set forth in Table 4 below. As shown in Table 4, the ceiling panel of Example 19 exhibits electric radiation-absorbing properties as good as 6 dB or more regardless of whether or not it comprises an aluminum foil provided on the back surface thereof.

Comparative Example 3

A mixture of 89.85 wt-% of a rock wool, 1 wt-% of a gel, 5.5 wt-% of a starch, 2.85 wt-% of attapulgite, 0.2 wt-% (as calculated in terms of solid content) of a 15% aqueous solution of polyacrylamide, 0.6 wt-% of aluminum sulfate and 25 wt-% of aluminum sulfate was subjected to dispersion by a mixer to prepare an aqueous slurry having a concentration of about 5 wt-%. The slurry thus prepared was subjected to paper making by means of a longitudinal paper making machine, and then dehydrated and dried to prepare an original sheet. The original sheet thus prepared was then cutting-processed on the surface thereof to obtain a panel V having a strength high enough for an interior ceiling panel. The strength, fire resistance, heat resistance, sound absorbing coefficient, electric radiation barrier properties and electric radiation-absorbing properties of the panel V are set forth in Table 4 below. As shown in Table 4, the ceiling panel of Comparative Example 3 exhibits no desired electric radiation-absorbing properties regardless of whether or not it comprises an aluminum foil provided on the back surface thereof.

Reference Example 1

A mixture of 89.80 wt-% of a rock wool, 1 wt-% of a gel, 5.5 wt-% of a starch, 2.85 wt-% of attapulgite, 0.2 wt-% (as calculated in terms of solid content) of a 15% aqueous solution of polyacrylamide, 0.6 wt-% of aluminum sulfate and 0.05 wt-% of a carbon fiber having a fiber length of 4 mm (Xylus, produced by OSAKA GAS CO., LTD.) was subjected to dispersion by a mixer to prepare an aqueous slurry having a concentration of about 5 wt-%. The slurry thus prepared was subjected to paper making by means of a longitudinal paper making machine, and then dehydrated and dried to prepare an original sheet. The original sheet thus prepared was then cutting-processed on the surface thereof to obtain a panel W having a strength high enough for an interior ceiling panel. The strength, fire resistance, heat resistance, sound absorbing coefficient, electric radiation barrier properties and electric radiation-absorbing properties of the panel W are set forth in Table 4 below. As shown in Table 4, the ceiling panel of Reference Example 1 exhibits desired electric radiation-absorbing properties when it comprises an aluminum foil provided on the back surface thereof but exhibits no sufficient electric radiation-absorbing properties when it comprises no aluminum foil provided on the back surface thereof.

Reference Example 2

A mixture of 89.25 wt-% of a rock wool, 1 wt-% of a gel, 5.5 wt-% of a starch, 2.85 wt-% of attapulgite, 0.2 wt-% (as calculated in terms of solid content) of a 15% aqueous solution of polyacrylamide, 0.6 wt-% of aluminum sulfate and 0.6 wt-% of a carbon fiber having a fiber length of 4 mm (Xylus, produced by OSAKA GAS CO., LTD.) was subjected to dispersion by a mixer to prepare an aqueous slurry having a concentration of about 5 wt-%. The slurry thus prepared was subjected to paper making by means of a longitudinal paper making machine, and then dehydrated and dried to prepare an original sheet. The original sheet thus prepared was then cutting-processed on the surface thereof to obtain a panel X having a strength high enough for an interior ceiling panel. The strength, fire resistance, heat resistance, sound absorbing coefficient, electric radiation barrier properties and electric radiation-absorbing properties of the panel X are set forth in Table 4 below. As shown in Table 4, the ceiling panel of Reference Example 2 doesn't exhibit electric radiation-absorbing properties as sufficient as 6 dB or more regardless of whether or not it comprises an aluminum foil provided on the back surface thereof.

TABLE 3

| | Example 12 Panel N | Example 13 Panel O | Example 14 Panel P | Example 15 Panel Q | Example 16 Panel R | Example 17 Panel S |
|---|---|---|---|---|---|---|
| Component | | | | | | |
| Rock wool [wt-%] | 89.75 | 89.45 | 89.55 | 89.7 | 89.55 | 89.67 |
| Beaten pulp [wt-%] | 1 | 1 | 1 | 1 | 1 | 1 |
| Starch [wt-%] | 5.5 | 5.5 | 5.5 | 5.5 | 5.5 | 5.5 |
| Attalpulgite [wt-%] | 2.85 | 2.85 | 2.85 | 2.85 | 2.85 | 2.85 |
| Polyacrylamide [wt-%] | 0.2 | 0.2 | 0.2 | 0.2 | 0.2 | 0.2 |
| Aluminum sulfate [wt-%] | 0.6 | 0.6 | 0.6 | 0.6 | 0.6 | 0.6 |
| Carbon fiber | | | | | | |
| [mm] | 4 | 4 | 4 | 4 | 4 | 12 |
| [wt-%] | 0.1 | 0.4 | 0.3 | 0.15 | 0.3 | 0.18 |
| Physical properties | | | | | | |
| Thickness [mm] | 12 | 12 | 9 | 15 | 12 | 12 |
| Bulk density [g/cm$^3$] | 0.4 | 0.4 | 0.4 | 0.4 | 0.4 | 0.4 |
| Unit weight [kg/cm$^2$] | 4.8 | 4.8 | 3.6 | 6.0 | 6.0 | 4.8 |
| Flexural strength [kgf/cm$^2$] | 15.2 | 15.3 | 15.6 | 15.0 | 17.5 | 15.5 |
| Heat resistance [m$^2$h · °C./kcal] | 0.27 | 0.26 | 0.20 | 0.33 | 0.28 | 0.27 |

TABLE 3-continued

|  | Example 12 Panel N | Example 13 Panel O | Example 14 Panel P | Example 15 Panel Q | Example 16 Panel R | Example 17 Panel S |
|---|---|---|---|---|---|---|
| Fire resistance | Incombustible | Incombustible | Incombustible | Incombustible | Incombustible | Incombustible |
| Sound absorbing coefficient | 0.49 | 0.48 | 0.44 | 0.52 | 0.45 | 0.48 |
| Electric radiation barrier properties (dB) | | | | | | |
| 2.45 GHz | 4.3 | 2.5 | 3.9 | 4.5 | 4.2 | 3.8 |
| 5.1 GHz | 5.2 | 2.0 | 4.6 | 5.5 | 5.1 | 4.5 |
| Electric radiation-absorbing properties (dB) | | | | | | |
| 2.45 GHz | 7 | 8 | 7 | 9 | 6 | 8 |
| 5.1 GHz | 6 | 8 | 6 | 8 | 6 | 6 |
| 2.45 GHz | 8 | 9 | 8 | 8 | 8 | 9 |
| 5.1 GHz (with an aluminum foil provided on the back surface) | 6 | 8 | 7 | 9 | 7 | 7 |
| Cost | Very low | Very low | Very low | Very low | Very low | Very low |
| Comprehensive evaluation | Good | Good | Good | Good | Good | Good |

(* Sound absorbing coefficient is represented by value averaged over measurements at 250 Hz, 500 Hz, 1,000 Hz and 2,000 Hz.)

TABLE 4

|  | Example 18 Panel T | Example 19 Panel U | Comparative Example 3 Panel V | Reference Example 1 Panel W | Reference Example 2 Panel X |
|---|---|---|---|---|---|
| Component | | | | | |
| Rock wool [wt-%] | 86.1 | 61.1 | 89.85 | 89.80 | 89.25 |
| Beaten pulp [wt-%] | 3 | 3 | 1 | 1 | 1 |
| Starch [wt-%] | — | — | 5.5 | 5.5 | 5.5 |
| Attalpulgite [wt-%] | 3 | 3 | 2.85 | 2.85 | 2.85 |
| Polyvinyl alcohol [wt-%] | 7 | 7 | — | — | — |
| Polyacrylamide [wt-%] | 0.2 | 0.2 | 0.2 | 0.2 | 0.2 |
| Aluminum sulfate [wt-%] | 0.6 | 0.6 | 0.6 | 0.6 | 0.6 |
| Aluminum hydroxide [wt-%] | — | 25 | — | — | — |
| Carbon fiber | | | | | |
| [mm] | 4 | 4 | — | 4 | 4 |
| [wt-%] | 0.1 | 0.1 | — | 0.05 | 0.6 |
| Physical Properties | | | | | |
| Thickness [mm] | 12 | 12 | 12 | 12 | 12 |
| Bulk density [g/cm$^3$] | 0.4 | 0.4 | 0.4 | 0.4 | 0.4 |
| Unit weight [kg/cm$^2$] | 4.8 | 5.4 | 4.8 | 4.8 | 4.8 |
| Flexural strength [kgf/cm$^2$] | 21 | 30 | 7.0 | 7.2 | 7.1 |
| Heat resistance [m$^2$h °C./kcal] | 0.29 | 0.25 | 0.27 | 0.26 | 0.26 |
| Fire resistance | Less incombustible | Incombustible | Incombustible | Incombustible | Incombustible |
| Sound absorbing coefficient | 0.48 | 0.42 | 0.49 | 0.48 | 0.48 |
| Electric radiation barrier properties (dB) | | | | | |
| 2.45 GHz | 4.2 | 5.1 | 0.1 | 5.5 | 6.0 |
| 5.1 GHz | 5.0 | 4.9 | 0.2 | 5.2 | 6.8 |

TABLE 4-continued

|  | Example 18 Panel T | Example 19 Panel U | Comparative Example 3 Panel V | Reference Example 1 Panel W | Reference Example 2 Panel X |
|---|---|---|---|---|---|
| Electric radiation-absorbing properties (dB) | | | | | |
| 2.45 GHz | 7 | 8 | 0 | 1 | 3 |
| 5.1 GHz | 6 | 6 | 0 | 1.5 | 4 |
| 2.45 GHz | 8 | 9 | 0 | 6 | 3 |
| 5.1 GHz (with an aluminum foil provided on the back surface) | 6 | 7 | 0 | 7 | 4 |
| Cost | Very low | Low | Very low | Very low | Very low |
| Comprehensive evaluation | Good | Good | Poor | Poor | Poor |

(* Sound absorbing coefficient is represented by value averaged over measurements at 250 Hz, 500 Hz, 1,000 Hz and 2,000 Hz.)

Method for Measuring and Evaluating the Properties in Tables 3 and 4

Flexural strength: Measured according to JIS A 1408 (No. 5 specimen).

Heat resistance: Measured according to JIS A 1420.

Fire resistance: Measured according to JIS A 1321.

Sound absorbing coefficient: Measured according to JIS A 1409 (reverberation room).

Electric radiation barrier properties: A specimen having a thickness of from 9 to 15 mm, a length of 400 mm and a width of 400 mm is placed between a transmitting antenna and a receiving antenna every test. The specimen is then measured for transmission level by time domain method. The transmission coefficient is calculated from the comparison with the transmission level measured in the absence of specimen to determine electric radiation barrier properties.

Electric radiation-absorbing properties: In order to prevent the occurrence of resonance phenomenon with reflected electric radiation and hence measure only the electric radiation-absorbing properties due to internal loss characteristic to the specimen, a specimen having a length of 400 mm and a width of 400 mm is placed with a 100 mm space provided in front of a metal plate having a size of 400 mm×400 mm so that no resonance phenomenon can occur. Under these conditions, reflection coefficient is measured by free space time domain method free from resonance phenomenon due to reflection of electric radiation. The reflection coefficient is then calculated from the comparison with the reflection level measured with the metal plate alone to determine electric radiation-absorbing properties. Subsequently, the specimen is laminated with an aluminum foil on the back surface thereof so that resonance phenomenon can occur. This specimen which undergoes resonance due to reflection of electric radiation, too, is measured for reflection coefficient by free space time domain method.

Comparison of Examples with Comparative Examples in Tables 3 and 4

1. All the examples and comparative examples exhibit a proper flexural strength value required for interior ceiling panel.
2. Referring to heat resistance, all the examples and comparative examples exhibit sufficient insulating properties, showing no significant difference.
3. Referring to fire resistance, Examples 12 to 17 and 19, Comparative Example 3 and Reference Examples 1 and 2 are judged incombustible while Example 18 is judged less incombustible but acceptable.
4. Examples 12 to 19, Comparative Example 3 and Reference Examples 1 and 2 exhibit a proper sound absorbing coefficient, showing no significant difference.
5. Referring to electric radiation barrier properties, Examples 12 to 19 and Reference Examples 1 to 2 exhibit from 2 to 6.8 dB, which is not sufficient for general electric radiation barrier material, in the absence of aluminum foil. Comparative Example 3 exhibits little or no electric radiation barrier properties.
6. Referring to electric radiation-absorbing properties, Examples 12 to 19 exhibit from 6 to 9 dB both at 2.45 GHz and 5.1 GHz regardless of whether or not they are integrated with an aluminum foil on the back surface thereof and hence sufficient absorption characteristics for countermeasuring against obstruction in wireless communication in an office in 2.4 GHz band and 5 GHz, which are used for wireless LAN system (6 dB or more). This demonstrates that the content of carbon fiber as used in Examples 12 to 19 makes it possible to provide good electric radiation-absorbing properties even in the case where the ceiling panel is integrated with an aluminum foil on the back surface thereof. On the other hand, Comparative Example 3, free of carbon fiber as an electrically-conductive material, exhibits no absorption characteristics. Reference Example 1, which has a low content of carbon fiber, exhibits desired electric radiation-absorbing properties due to loss of electric radiation caused by resonance phenomenon when it comprises an aluminum foil provided on the back surface thereof but exhibits no sufficient absorption characteristics when it is free of aluminum foil on the back surface thereof. Comparative Example 2, which has a high content of carbon fiber, doesn't exhibit sufficient absorption characteristics due to the effect of reflection of electric radiation even when it is free of aluminum foil on the back surface thereof.

Example 20

To various ceiling panels prepared in the same manner as in Reference Example 1 except that the content of carbon fiber was varied were each applied a vinyl acetate-based emulsion paint (polyvinyl acetate-based PC coat) having various contents of a pitch-based carbon fiber having a fiber length of 0.7 mm by a roller coater in an amount of 625 g/m² to obtain various ceiling panels. The content of carbon fiber in the surface and back surface (PC coat) of these ceiling panels and the corresponding electric radiation-absorbing properties are set forth in Table 5.

For the measurement of the electric radiation-absorbing properties, the same method as used in Examples 12 to 19 was used.

TABLE 5

| Electric radiation-absorbing property | Content of carbon fiber (wt-%) | | | | | |
|---|---|---|---|---|---|---|
| measured value (dB) | 0.02 | 0.04 | 0.05 | 0.08 | 0.10 | 0.40 |
| Content of carbon fiber in PC coat (wt-%) | | | | | | |
| 0 | 0.5 | 0.8 | 1.2 | 4.2 | 7.2 | 8.1 |
| 0.5 | 2.1 | 2.2 | 2.4 | 4.3 | 7.3 | 8.3 |
| 1.0 | 2.5 | 4.1 | 5.4 | 6.1 | 8.1 | 8.5 |
| 5.0 | 4.2 | 5.4 | 6.2 | 6.5 | 8.6 | 9.1 |
| 10.0 | 4.5 | 6.3 | 6.4 | 6.8 | 8.6 | 8.5 |
| 15.0 | 4.0 | 6.2 | 6.2 | 6.9 | 8.5 | 8.3 |

As shown in Table 5, when the content of carbon fiber in the surface (particularly referred to as "CF1") is 0.10 wt-%, extremely excellent electric radiation-absorbing properties can be obtained even if no carbon fiber is incorporated in PC coat. However, when CF1 is 0.08 wt-% or less, no sufficient electric radiation-absorbing properties can be obtained in the structure having no aluminum foil. On the contrary, even when CF1 is low, the electric radiation-absorbing properties can be remarkably improved by applying a PC coat having a higher carbon fiber content (the content of carbon fiber in PC coat is particularly referred to as "CF2") to the back surface of the ceiling panel.

In particular, by properly designing the two carbon fiber contents, absorption characteristics suitable for use in wireless communication (wireless LAN) can be obtained (6 dB or more). Specifically, when the content of carbon fiber in the surface of the ceiling panel (CF1) is from 0.04 to 0.08 wt-% and the content of carbon fiber in PC coat (CF2) is from 1.0 to 15.0 wt-%, the foregoing suitable absorption characteristics can be obtained.

As mentioned above, the incombustible sound-absorbing electric radiation-absorbing ceiling panel according to the invention has a light weight and exhibits fire resistance ranging from semi-incombustibility (i.e., less incombustibility) to incombustibility. The incombustible sound-absorbing electric radiation-absorbing ceiling panel also exhibits sound-absorbing properties, heat insulation properties and electric radiation-absorbing properties in combination. The ceiling panel of the invention is available at a reduced cost and exhibits a sufficient flexural strength. Accordingly, the ceiling panel of the invention exerts an effect as an incombustible sound-absorbing electric radiation-absorbing ceiling panel which can meet various needs for structural and building members of building.

The foregoing incombustible sound-absorbing electric radiation-absorbing ceiling panel may have a laminated structure comprising a layer free of carbon fiber and a layer containing carbon fiber to form an interior ceiling panel which exerts a design effect of showing a good external appearance on the surface thereof facing the interior of the room to which it is applied.

Further, when the ceiling panel of the invention is provided in the form of metal foil-clad incombustible sound-absorbing electric radiation-absorbing ceiling panel, it can exhibit enhanced electric radiation barrier properties in addition to electric radiation-absorbing properties enhanced by the addition of electric radiation absorption caused by the resonance phenomenon with reflected electric radiation.

Moreover, the incombustible sound-absorbing electric radiation-absorbing ceiling panel according to the invention may comprise the foregoing carbon fiber having a fiber length of from 1 to 30 mm incorporated therein in an amount of from 0.08 to 0.4 wt-% to provide excellent electric radiation-absorbing properties without adding electric radiation-absorbing properties due to resonance phenomenon with reflected radiation. In particular, electric radiation-absorbing properties suitable for use in wireless communication (wireless LAN), particularly 6 dB or more, can be exhibited.

Further, when the content of the foregoing carbon fiber having a fiber length of from 1 to 30 mm is from 0.04 to 0.08 wt-% and an organic paint having a higher carbon fiber content than the foregoing carbon fiber content is applied to the back surface of the ceiling panel, excellent electric radiation-absorbing properties can be obtained particularly for use in wireless communication.

While the invention has been described in detail and with reference to specific embodiments thereof, it will be apparent to one skilled in the art that various changes and modifications can be made therein without departing from the spirit and scope thereof.

What is claimed is:

1. An incombustible sound-absorbing electric radiation-absorbing ceiling panel having a thickness of from 1 mm to 30 mm obtained by subjecting a water-dispersed slurry of a mixture of from 67 to 92 wt-5 of a rock wool, from 0.5 to 8 wt-% of a beaten pulp, from 2 to 13 wt-% of a binder made of an organic resin, from 0.15 to 1 wt-% of a flocculating agent, from 0.5 to 10 wt-% of a natural mineral fiber and from 0.02 to 1 wt-% of carbon, said carbon being in the form carbon fibers having a fiber length of from 1 mm to 30 mm to wet paper making.

2. An incombustible sound-absorbing electric radiation-absorbing ceiling panel with a thickness of from 1 mm to 30 mm having a laminated structure comprising a layer obtained by subjecting a water-dispersed slurry of a primary mixture of from 67 to 92 wt-% of a rock wool, from 0.5 to 8 wt-% of a beaten pulp, from 2 to 13 wt-% of a binder made of an organic resin, from 0.15 to 1 wt-% of a flocculating agent and from 0.5 to 10 wt-% of a natural mineral fiber to wet paper making and a layer obtained by subjecting a water-dispersed slurry of a secondary mixture having the same composition as said primary mixture except for further containing from 0.01 to 1 wt-% of carbon, said carbon being in the form of carbon fibers having a fiber length of from 1 mm to 30 mm to wet paper making.

3. The incombustible sound-absorbing electric radiation-absorbing ceiling panel as in claim 1 or 2, wherein said carbon fiber has been subjected to a preliminary treatment which comprises introducing a carbon fiber into water in a proportion of from 0.5 to 2 wt-% based on the weight of water, and then stirring the mixture by a mixer at a rotary speed of from 100 to 400 r.p.m.

4. The incombustible sound-absorbing electric radiation-absorbing ceiling panel as in claim 1 or 2, comprising an additive such as inorganic filler incorporated therein in an amount of 50 wt-% or less to substitute for said rock wool.

5. The incombustible sound-absorbing electric radiation-absorbing ceiling panel as in claim 1 or 2, wherein said ceiling panel is obtained by applying a metal foil to the back surface of a ceiling panel.

6. The incombustible sound-absorbing electric radiation-absorbing ceiling panel as in claim 1 or 2, wherein the content of said carbon fiber is from 0.08 to 0.4 wt-%.

7. The incombustible sound-absorbing electric radiation-absorbing ceiling panel as in claim 1 or 2, wherein said ceiling panel is obtained by applying to the back surface of the ceiling panel comprising the carbon fiber therein in an amount of from 0.04 to 0.08 wt-% and an organic paint comprising a greater content of carbon fiber than that of said ceiling panel in an amount of from 100 to 3,000 g/m$^2$.

8. The incombustible sound-absorbing electric radiation-absorbing ceiling panel as in claim 7, wherein the content of carbon fiber in said organic paint is from 1.0 to 15.0 wt-%.

* * * * *